United States Patent [19]

Miller et al.

[11] Patent Number: 5,977,678
[45] Date of Patent: Nov. 2, 1999

[54] MAGNETIC COUPLING MECHANISM FOR USE IN AN AUTOMOTIVE VEHICLE

[75] Inventors: Robin Mihekun Miller, Ellington, Conn.; Monte L. Falcoff, Beverly Hills, Mich.

[73] Assignee: UT Automotive Dearborn, Inc., Dearborn, Mich.

[21] Appl. No.: 08/947,709

[22] Filed: Oct. 9, 1997

[51] Int. Cl.[6] .......................... H02K 49/00; H02K 49/10; A47L 1/02
[52] U.S. Cl. ........................................ 310/103; 15/250.34
[58] Field of Search .................. 310/103, 83; 15/250.22, 15/250.34

[56] References Cited

U.S. PATENT DOCUMENTS

| | | | |
|---|---|---|---|
| 1,548,016 | 7/1925 | Riboisiere | 310/100 |
| 2,271,207 | 1/1942 | Rhein | 310/209 |

(List continued on next page.)

FOREIGN PATENT DOCUMENTS

| | | |
|---|---|---|
| 0 345 002 A2 | 6/1989 | European Pat. Off. . |
| 1.281.424 | 12/1961 | France . |
| 2 724 616 | 3/1996 | France . |
| 822 178 | 11/1951 | Germany . |
| 27 28 088 | 1/1978 | Germany . |
| 28 16 201 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 649553 | 1/1951 | United Kingdom . |
| 1 448 892 | 9/1976 | United Kingdom . |
| 1 580 926 | 12/1980 | United Kingdom . |
| 365603 | 1/1982 | United Kingdom . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

UTRC Notes, Nov. 5, 1993.
Permag Corp./Dexter Corp. Quotation; May 25, 1994.
Warner Electric UniModule® Advertisement (prior to Oct. 9, 1997).
Patent Abstracts of Japan, vol. 016, 7–438 (M–1309), Sep. 11, 1992 for JP Patent Publication No. 04151351.
Page 100, *Machine Design*, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.

(List continued on next page.)

*Primary Examiner*—Clayton LaBalle
*Attorney, Agent, or Firm*—Harness, Dickey & Pierce, P.L.C.

[57] ABSTRACT

A multi-functional apparatus employing a magnetic coupling mechanism. The magnetic coupling mechanism selectively couples an actuator shaft and a second shaft driven by a rotatable driving member. In another aspect of the present invention, the magnetic coupling of the shafts is electrically controlled, whereby the driven shaft can be actuated independently from other systems actuated by the multi-functional apparatus. In an automotive context, a window wiper may be attached to the driven shaft, such that when the magnetic coupling mechanism is disengaged the window wiper can move in relation to upward pivotal movement of the opened window.

16 Claims, 7 Drawing Sheets

U.S. PATENT DOCUMENTS

| | | | |
|---|---|---|---|
| 2,345,778 | 4/1944 | Lammeren et al. | 318/289 |
| 2,615,945 | 10/1952 | Jaeschke | 310/103 |
| 2,659,237 | 11/1953 | Wood | 74/27 |
| 2,722,617 | 11/1955 | Cluwen et al. | 310/103 |
| 2,953,802 | 9/1960 | Ziegler | 15/250.02 |
| 2,959,803 | 11/1960 | Ziegler | 15/250.02 |
| 3,163,791 | 12/1964 | Carlson | 310/83 |
| 3,361,005 | 1/1968 | Carpenter | 74/436 |
| 3,361,947 | 1/1968 | Schlebusch | 310/209 |
| 3,421,380 | 1/1969 | Mansour | 74/84 |
| 3,442,146 | 5/1969 | Simpson | 74/84 |
| 3,443,442 | 5/1969 | Schweihs | 74/84 R |
| 3,443,455 | 5/1969 | Zugel | 74/820 |
| 3,516,610 | 6/1970 | Stevens | 15/250.17 |
| 3,523,204 | 8/1970 | Rand | 310/103 |
| 3,574,882 | 4/1971 | Petry | 15/250.2 |
| 3,619,676 | 11/1971 | Kawakami | 310/209 |
| 3,659,128 | 4/1972 | Danek | 310/103 |
| 3,665,772 | 5/1972 | Beard et al. | 74/75 |
| 3,688,332 | 9/1972 | Bellware | 15/250.16 |
| 3,689,817 | 9/1972 | Elliott | 318/443 |
| 3,694,723 | 9/1972 | Schneider et al. | 318/443 |
| 3,705,520 | 12/1972 | Carpenter | 74/600 |
| 3,803,627 | 4/1974 | Schuscheng | 343/903 |
| 3,858,922 | 1/1975 | Yamanaka | 292/221 |
| 3,917,330 | 11/1975 | Quantz | 292/216 |
| 3,927,436 | 12/1975 | Inoue et al. | 15/250.17 |
| 3,979,619 | 9/1976 | Whiteley | 310/154 |
| 4,009,952 | 3/1977 | Badalich et al. | 353/109 |
| 4,065,234 | 12/1977 | Yoshiyuki et al. | 417/420 |
| 4,158,159 | 6/1979 | Orris et al. | 318/443 |
| 4,173,055 | 11/1979 | Izumi et al. | 15/250.02 |
| 4,183,114 | 1/1980 | Eden | 15/250.25 |
| 4,259,624 | 3/1981 | Seibicke | 318/282 |
| 4,271,381 | 6/1981 | Munz et al. | 318/282 |
| 4,309,646 | 1/1982 | Liedtke et al. | 318/443 |
| 4,336,482 | 6/1982 | Goertler et al. | 318/443 |
| 4,352,299 | 10/1982 | Riggs et al. | 74/84 R |
| 4,422,522 | 12/1983 | Slavin et al. | 180/281 |
| 4,434,678 | 3/1984 | Maus | 74/471 R |
| 4,450,390 | 5/1984 | Andrei-Alexandru et al. | 180/289 |
| 4,478,004 | 10/1984 | Andrei-Alexandru et al. | 49/72 |
| 4,492,904 | 1/1985 | Graham | 318/444 |
| 4,507,711 | 3/1985 | Ono et al. | 362/272 |
| 4,553,656 | 11/1985 | Lense | 192/142 R |
| 4,573,723 | 3/1986 | Morita et al. | 292/336.3 |
| 4,630,178 | 12/1986 | Mugford et al. | 362/512 |
| 4,639,065 | 1/1987 | Kohler et al. | 339/119 R |
| 4,660,698 | 4/1987 | Miura | 192/45 |
| 4,674,781 | 6/1987 | Reece et al. | 292/336.3 |
| 4,701,972 | 10/1987 | Saito | 15/250.22 |
| 4,702,117 | 10/1987 | Tsutsumi et al. | 74/89.17 |
| 4,724,760 | 2/1988 | Bubley | 74/436 |
| 4,733,147 | 3/1988 | Muller et al. | 318/443 |
| 4,793,640 | 12/1988 | Stewart, Sr. | 74/436 |
| 4,875,053 | 10/1989 | Harada | 343/900 |
| 4,878,398 | 11/1989 | Heinrich | 74/959 |
| 4,885,512 | 12/1989 | Gille et al. | 318/444 |
| 4,893,039 | 1/1990 | Isii | 310/89 |
| 4,918,272 | 4/1990 | Nishikawa | 200/501 |
| 5,007,131 | 4/1991 | Chevalier et al. | 15/250.19 |
| 5,023,530 | 6/1991 | Ohashi er al. | 318/446 |
| 5,045,741 | 9/1991 | Dvorsky | 310/209 |
| 5,063,317 | 11/1991 | Bruhn | 310/91 |
| 5,182,957 | 2/1993 | Bohmer et al. | 74/42 |
| 5,214,440 | 5/1993 | Takahashi et al. | 343/903 |
| 5,218,255 | 6/1993 | Horiguchi | 310/71 |
| 5,222,775 | 6/1993 | Kato | 292/201 |
| 5,228,239 | 7/1993 | Heo | 49/280 |
| 5,251,114 | 10/1993 | Cantin et al. | 362/286 |
| 5,274,875 | 1/1994 | Chou | 15/250.19 |
| 5,291,109 | 3/1994 | Peter | 318/443 |
| 5,315,735 | 5/1994 | I-Shin | 15/103 |
| 5,333,351 | 8/1994 | Sato | 15/250.13 |
| 5,355,061 | 10/1994 | Forhan | 318/443 |
| 5,355,286 | 10/1994 | Flint | 362/65 |
| 5,373,605 | 12/1994 | Austin | 74/37 |
| 5,427,345 | 6/1995 | Yamakami et al. | 248/394 |
| 5,462,337 | 10/1995 | Yamakami | 192/88.1 |
| 5,519,258 | 5/1996 | Stroven et al. | 307/10.1 |
| 5,528,959 | 6/1996 | Yamakami | 246/396 |
| 5,549,837 | 8/1996 | Ginder et al. | 252/62.52 |
| 5,691,586 | 11/1997 | Yonnet et al. | 310/103 |
| 5,694,812 | 12/1997 | Maue et al. | 74/471 R |
| 5,730,028 | 3/1998 | Maue et al. | 403/92 |
| 5,763,981 | 6/1998 | Okazaki et al. | 310/323 |
| 5,844,382 | 12/1998 | Dan | 318/10 |

OTHER PUBLICATIONS

Mechine Deisgn, "Basics of Design Engineering," Jun. 1992, Article "Mechanical Systems".

A paper from the Third Conference Mechanisms, "A Survey of Intermittent–Motion", F.J.Bogardus, 1956, pp. 8–15.

Machine Design, Mechansims for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanism for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanisms III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Exhibit A—(UTA 26 Gate Wiper Motor), prior to Oct. 9, 1997.

Exhibit B—(1996 Ford Windstar Wiper Motor), prior to Oct. 9, 1997.

Exhibit C—(1996 Chevy Blazer Wiper Motor), prior to Oct. 9, 1997.

Exhibit D—(1996 Honda Civic Rear Unidirectional Wiper Motor), prior to Oct. 9, 1997.

Exhibit E—(1996 Toyota Direct Drive Unidirectional Wiper Motor), prior to Oct. 9, 1997.

Exhibit F—(1996 Honda Civic Wiper Motor), prior to Oct. 9, 1997.

Exhibit G—(Wiper Motor), prior to Oct. 9, 1997.

Exhibit H—(Wiper Motor), prior to Oct. 9, 2997.

PCT International Search Report dated Feb. 11, 1999.

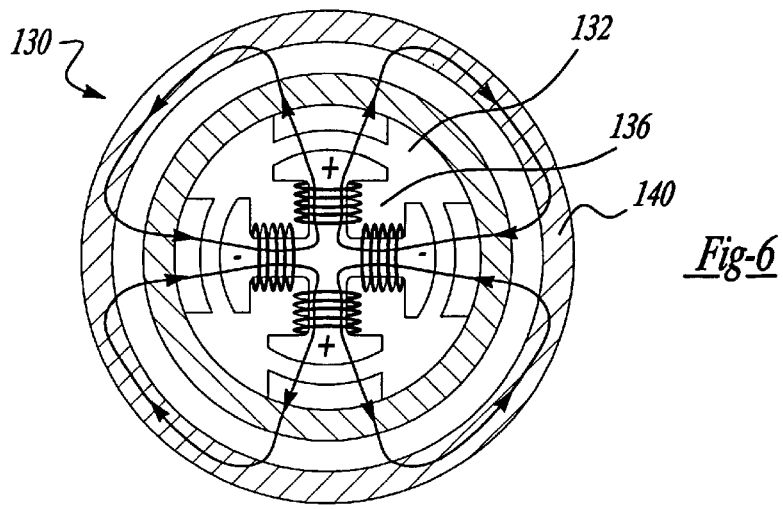
_Fig-6_
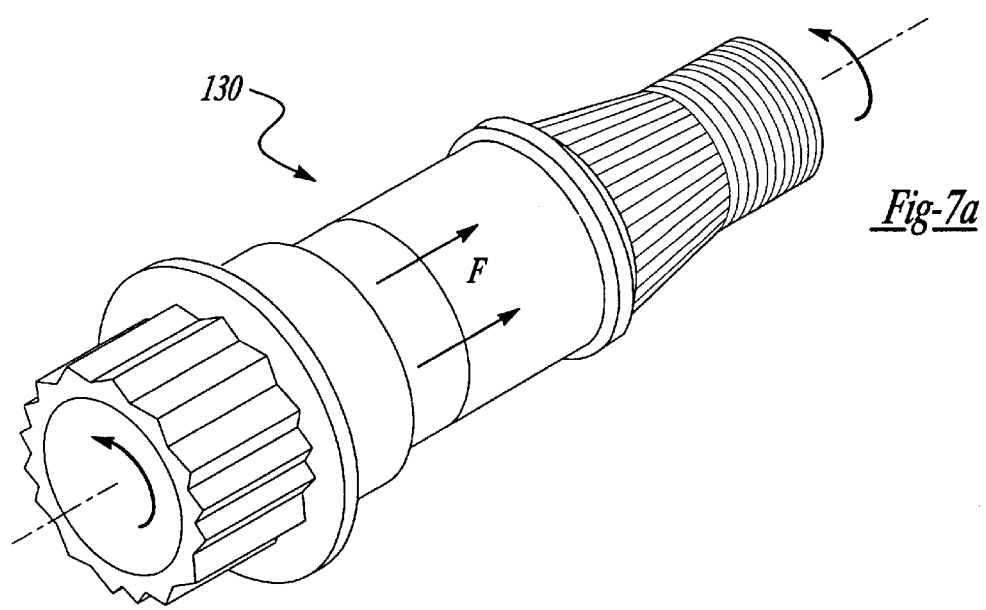
_Fig-7a_
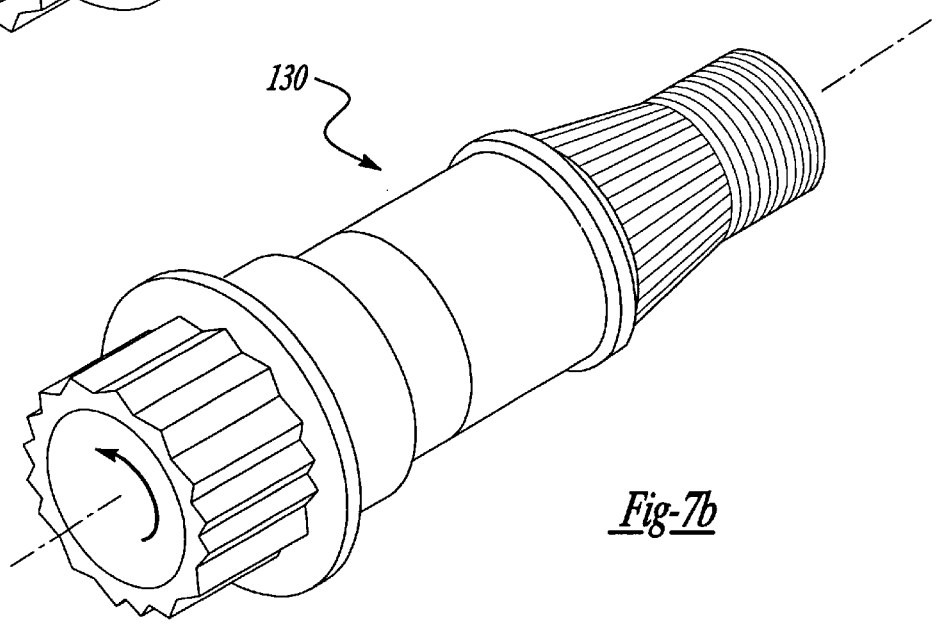
_Fig-7b_

MAGNETIC COUPLING MECHANISM FOR USE IN AN AUTOMOTIVE VEHICLE

BACKGROUND OF THE INVENTION

This invention relates generally to a magnetic coupling system and specifically to a magnetic coupling device for use in an automotive vehicle.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed with the following U.S. Pat. Nos. 4,893,039 entitled "Windshield Wiper Motor" which issued to Lsii on Jan. 9, 1990; 4,878,398 entitled "Driving Device for Window Wiper of Motor Vehicles" which issued to Heinrich on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window: which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors or solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise and failure modes are increased.

SUMMARY OF THE INVENTION

In accordance with the present invention, a magnetic coupling mechanism for use in a multi-functional apparatus. The magnetic clutch mechanism selectively couples the window wiper shaft to an actuator shaft. This magnetic clutch feature enables the wiper shaft to be actuated independently of other mechanisms actuated by the multi-functional apparatus. With regards to the multi-functional apparatus, a electromagnetic device selectively causes movement of an intermittent motion mechanism thereby moving a mechanical device coupled thereto. In another aspect of the present invention, a single electric motor selectively actuates three intermittent motion mechanisms thereby causing three mechanical devices coupled thereto to operate. For instance, the electric motor may actuate a wiper shaft attached to a window wiper, a door lock and a window lock.

Thus, the present invention is advantageous over other known devices in that the shaft coupling can be controlled electrically, rather than mechanically with moving parts. The magnetic coupling of the present invention further reduces mating mechanical parts, thereby reducing wear and increasing durability of the system. Moreover, in the setting of a multi-functional apparatus for a automotive vehicle, the window and door can be unlocked even if the window wiper is frozen onto the window. A multi-functional apparatus employing a magnetic coupling mechanism is further advantageous over conventional systems since the present invention combines many different functions into a single apparatus. For example, a conventional multi-functional apparatus replaces the traditional separate rear wiper motor, liftgate lock/unlock motor and rear window unlock solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Additional advantages and features of the present invention will become apparent from the following description and appended claims, taken in conjunction with the accompanying drawings.

BRIEF DESCRIPTION OF THE DRAWINGS

FIG. 6 is a cross sectional view, taken along line 6—6 of FIG. 5, showing a first preferred embodiment of a solenoid segment used in a magnetic coupling mechanism of the present invention;

FIGS. 7A and 7B are fragmentary perspective views showing the first preferred embodiment of the magnetic clutch mechanism of the present invention in an engaged and disengaged state, respectively;

DETAILED DESCRIPTION OF THE PREFERRED EMBODIMENT

Figure 1:
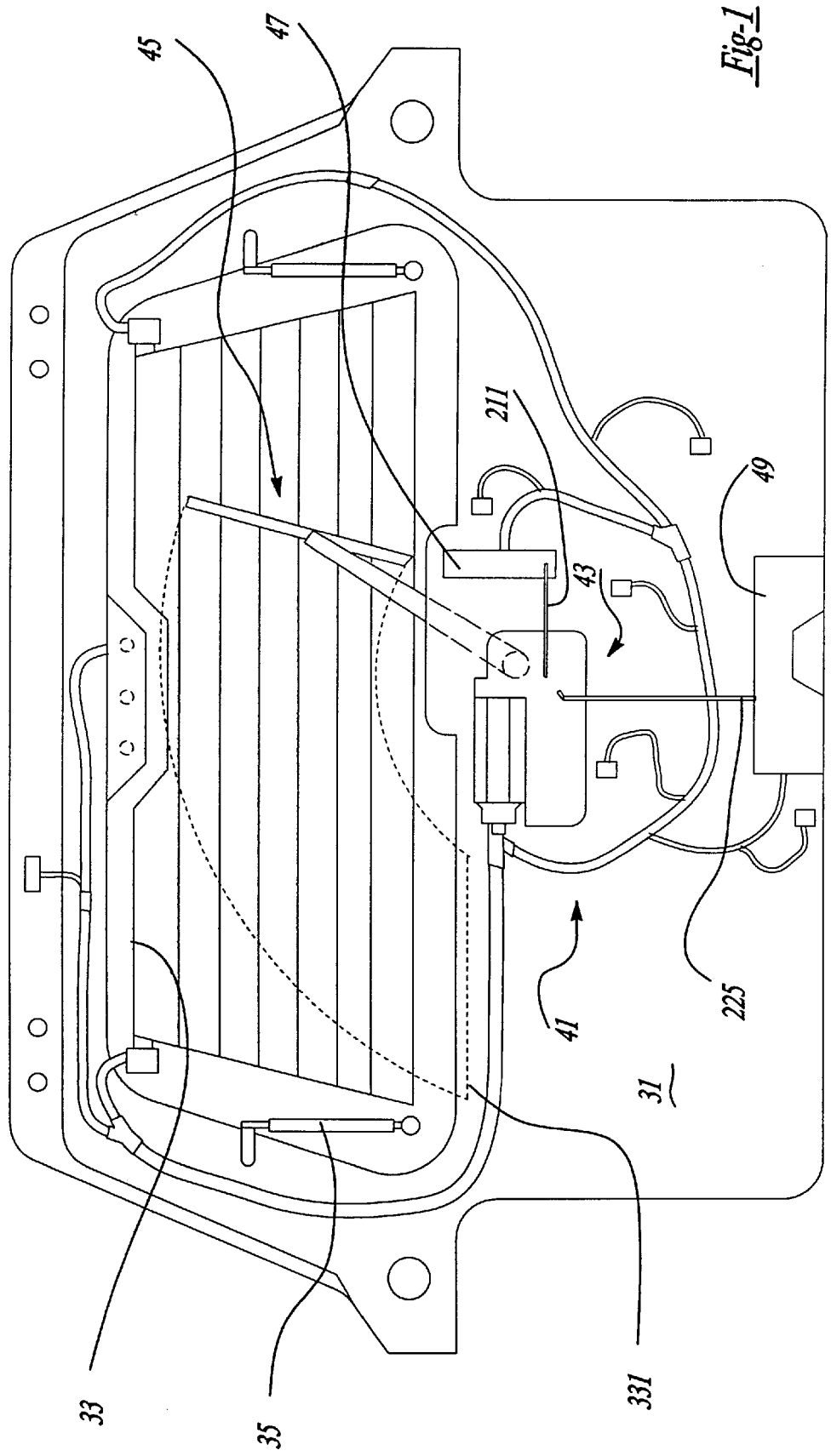
FIG. 1 is front elevational view showing a first preferred embodiment of a multi-functional apparatus employing a magnetic coupling mechanism of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position substantially flush with the outer surface of liftgate 31, to an open position about upper hinges. A pair of pneumatic cylinders 35 act to push window 33 toward the open position when a lower portion of window 33 is released. A first preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch or lock 47 and a liftgate lock 49, all of which are mounted upon liftgate 31.

The construction of central drive and power transmission unit 43 is best illustrated in FIGS. 1–4. An electromagnetic device such as an electric motor 51 is of a conventional fractional horsepower, dc electromagnetic variety having a metallic motor housing within which are stationary permanent magnets, a rotatable armature with wire windings, a rotatable armature shaft 53 joined to the armature, a commutator electrically connected to the wire windings and rotatable with the armature shaft, a brush card assembly and various electronic components. It will be apparent to those skilled in the art that other electric motor constructions can readily be substituted for that shown. A worm gear segment 55 is provided upon a portion of armature shaft 53 extending beyond the motor housing.

A gear housing 57 is also provided for receiving worm gear segment 55 and the immediately adjacent portions of armature shaft 53. A main helical gear 59 is also housed and rotatably journalled within gear housing 57. A collar 61 stationarily extends from housing 57 co-axial with a rotational axis of helical gear 59. Gear housing 57 is preferably made from cast aluminum. Helical gear 59 has an external set of helically oriented teeth 71 for meshing with worm gear segment 55. Helical gear 59 further has an internally oriented set of splines 73. A spring tab 75 having a driving interface surface is mounted upon an outer face 77 of helical gear 59 by a pair of rivets, screws, sonic welded pins, hot air cold upset pins, or the like. Spring tab 75 is preferably stamped spring steel. Of course, other driving interface means may be employed such as an integrally molded finger, screw, rivet, compression spring, rib or other similar formations projecting from a face or peripheral portion thereof. Helical gear 59 is preferably injection molded from a polymeric material such as acetyl. An electrically conducting feedback disk 81 is retained to an inside face 83 of helical gear 59 through ultrasonically rolled welding or insert molding. Feedback disk 81 is comprised of a set of copper alloy or brass stamped contacts which are provided with differing conductive and nonconductive patterns depending on the specific positional ranges as will be discussed in greater detail hereinafter. An electronic control module housing 91 has an electronic control module shell section 93 and a gear cover section 95. An actuator shaft 99 has a spur gear segment 101 and a carrier segment 103 divided by an annular flange 105. Spur gear segment 101 has a set of splines 107 around an exterior peripheral surface thereof for longitudinally sliding along, while remaining enmeshed with splines 73 of helical gear 59. Spur gear segment 101 further has an internal cylindrical passageway 109 journalized upon spindle 97 of gear cover section 95. A stiff compression spring 111 is disposed between flange 105 and a hub of helical gear 59 for biasing actuator shaft 99 toward a driven window wiper shaft 121. The carrier segment 103 of actuator shaft 99 is further defined with an enclosed solenoid segment 132. A magnetically conductive segment 140 is further defined on the end of the window wiper shaft 121 which abuts the solenoid segment 132 of the actuator shaft 99. Actuator shaft 99 and wiper shaft 121 comprise a "split shaft" construction that act in conjunction to define a magnetic coupling mechanism 130. Wiper shaft 121 further has a distal end with threads 152 thereon upon which is attached a wiper arm 150 and nut in a conventional manner. Wiper shaft 121 further has a circular brim 154 which provides a bearing surface upon a distal edge of collar 61. A cap 156 with an aperture therein serves to retain brim 154 against collar 61. Actuator shaft 99 is preferably powdered metal while wiper shaft 121 is made from cold rolled steel.

Figure 2:
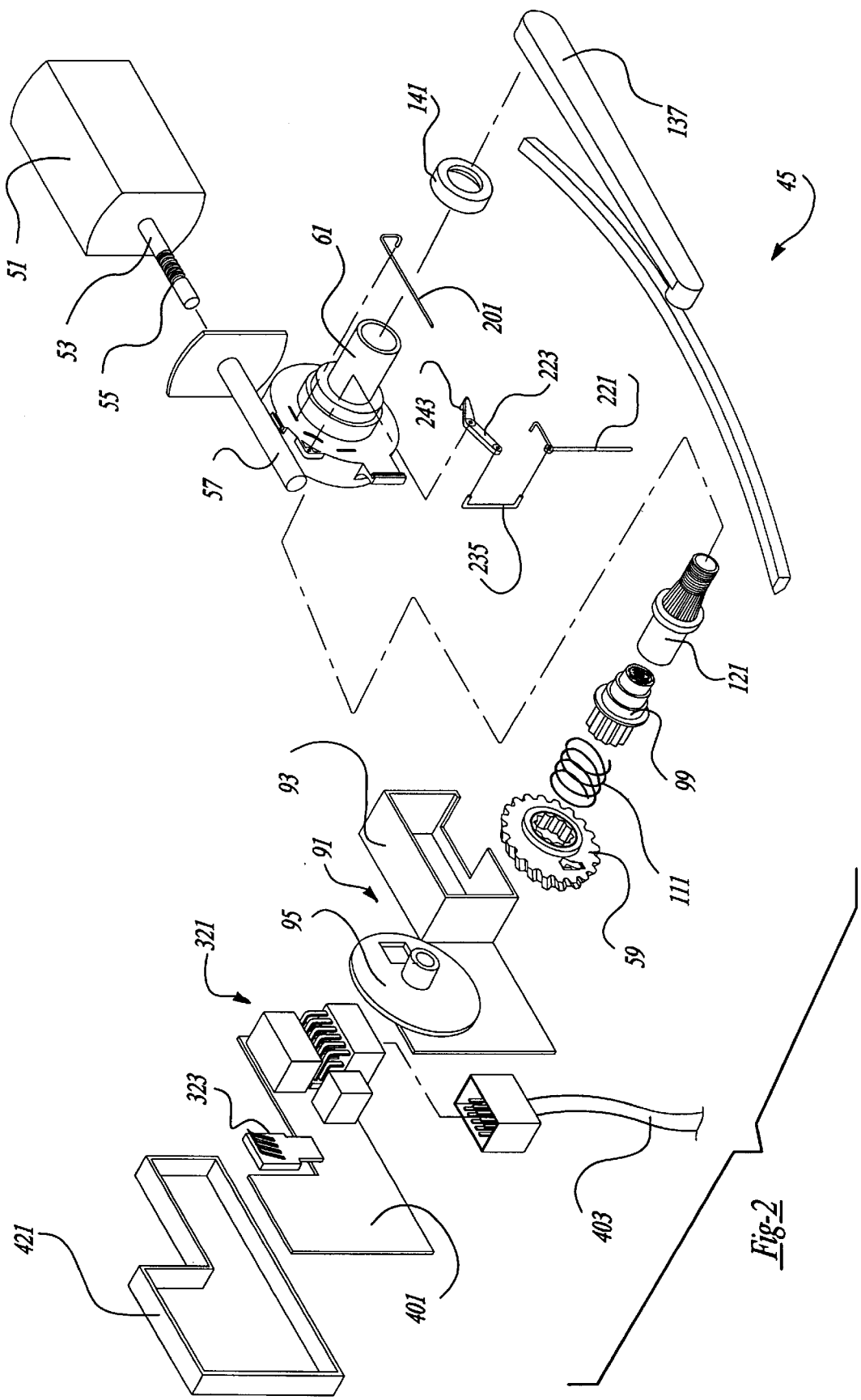
FIG. 2 is an exploded perspective view showing the first preferred embodiment of a multi-functional apparatus employing a magnetic coupling mechanism of the present invention.
Figure 4:
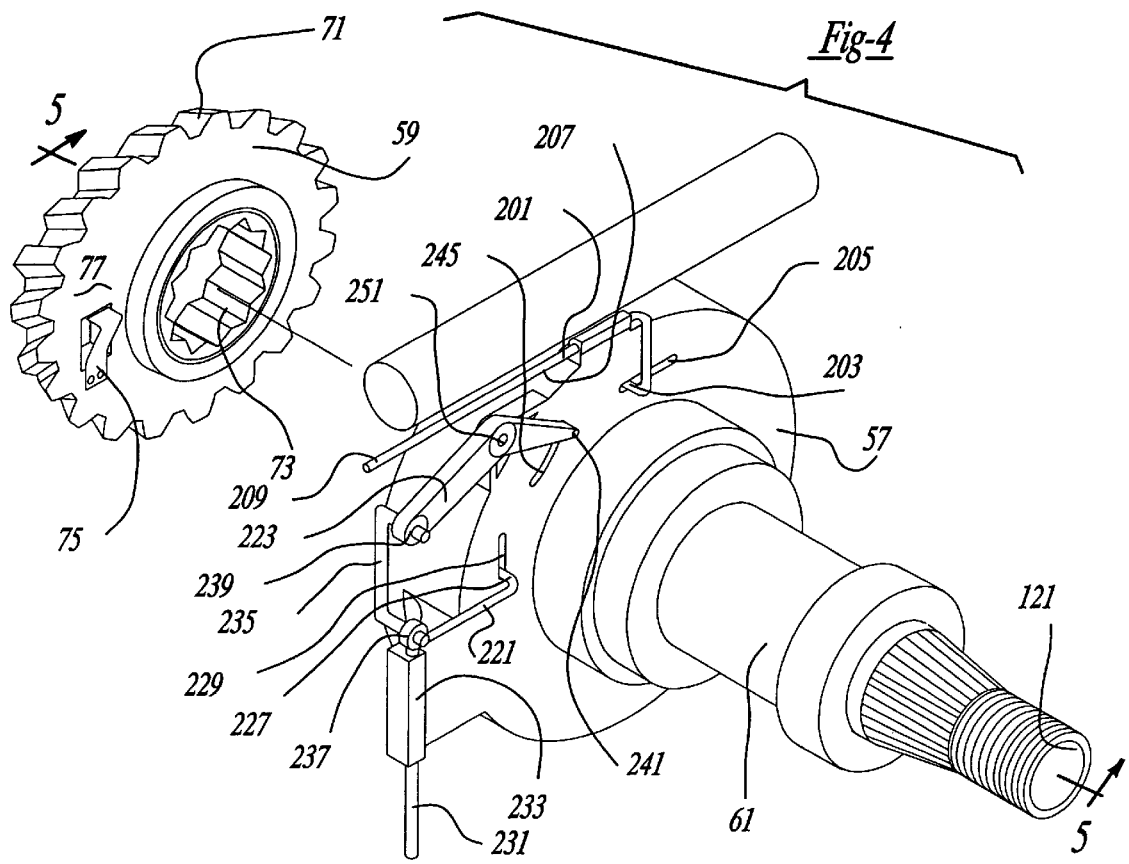
FIG. 4 is a perspective view, with a main gear exploded away therefrom and with an electric motor broken away therefrom, showing the first preferred embodiment of the multi-functional apparatus of the present invention.

Referring to FIGS. 1, 2 and 4, window lock 47 is actuated by an intermittent motion mechanism further defined as a liftgate window release lock linkage 201. Window linkage 201 is constructed from a steel wire. A leading end 203 of window linkage 201 is bent so as to extend through a slot 205 in gear housing 57. Furthermore, a median segment 207 of window linkage 201 is linearly slidable within a passageway formed through gear housing 57. A trailing end 209 of window linkage 201 is coupled to a window lock connecting rod 211.

A primary lock linkage 221 and a secondary lock linkage 223 are coupled to liftgate lock 49 through a connecting rod 225. Primary lock linkage 221 is also a bent steel wire having a leading end 227 protruding within a slot 229 of hear housing 57. A median segment 231 is slidably trapped within a support 233 extending from gear housing 57. A C-shaped bent wire 235 couples an elbow 237 of primary lock linkage 221 to a distal end 239 of secondary lock linkage 223. Secondary lock linkage 223 further has a proximal end 241 with a pin 243 protruding therefrom which enters and arcuate slot 245 of gear housing 57. Secondary lock linkage 223 is pivotable about a central fulcrum 251 mounted to gear housing 57. Wire 235 can be pivotably joined to primary and secondary lock linkages, respectively 221 and 223, via bent metal wire clips, polymeric force-fit collars, push nuts or the like. Linkages 209, 221 and 223 may also be coupled to their respective connecting rods through similar fasteners. Lock linkages 221 and 223 are also considered to act as intermittent motion mechanisms based on their selectively actuated operation as will be discussed hereinafter. Linkages 201, 221 and 223 may alternately be constructed as pivoting or sliding members, having an infinite variety of shapes, and constructed from plastic, cast metal, powdered metal, bent wire, geared members or the like. It should further be understood that the connecting rods may be substituted by cables, belts, gears, a plurality of mechanical linkages, chains, jackscrews or other force transmitting and coupling means.

As can best be observed in FIG. 2, electronic control module includes a rear node microprocessor preferably using a Motorola MC68HCO5V6 (or alternately MC68HCO5V7) chip mounted upon a rigid printed circuit board 401. Rear node electronic control unit 321 is electrically connected to a central body computer (not shown) in a multiplexed (MUX) fashion through a wire harness 403. A J1850MUX protocol is used. An electronic control module cover 421 secures electronic control unit 321 within electronic control module housing 91.

Figure 3:
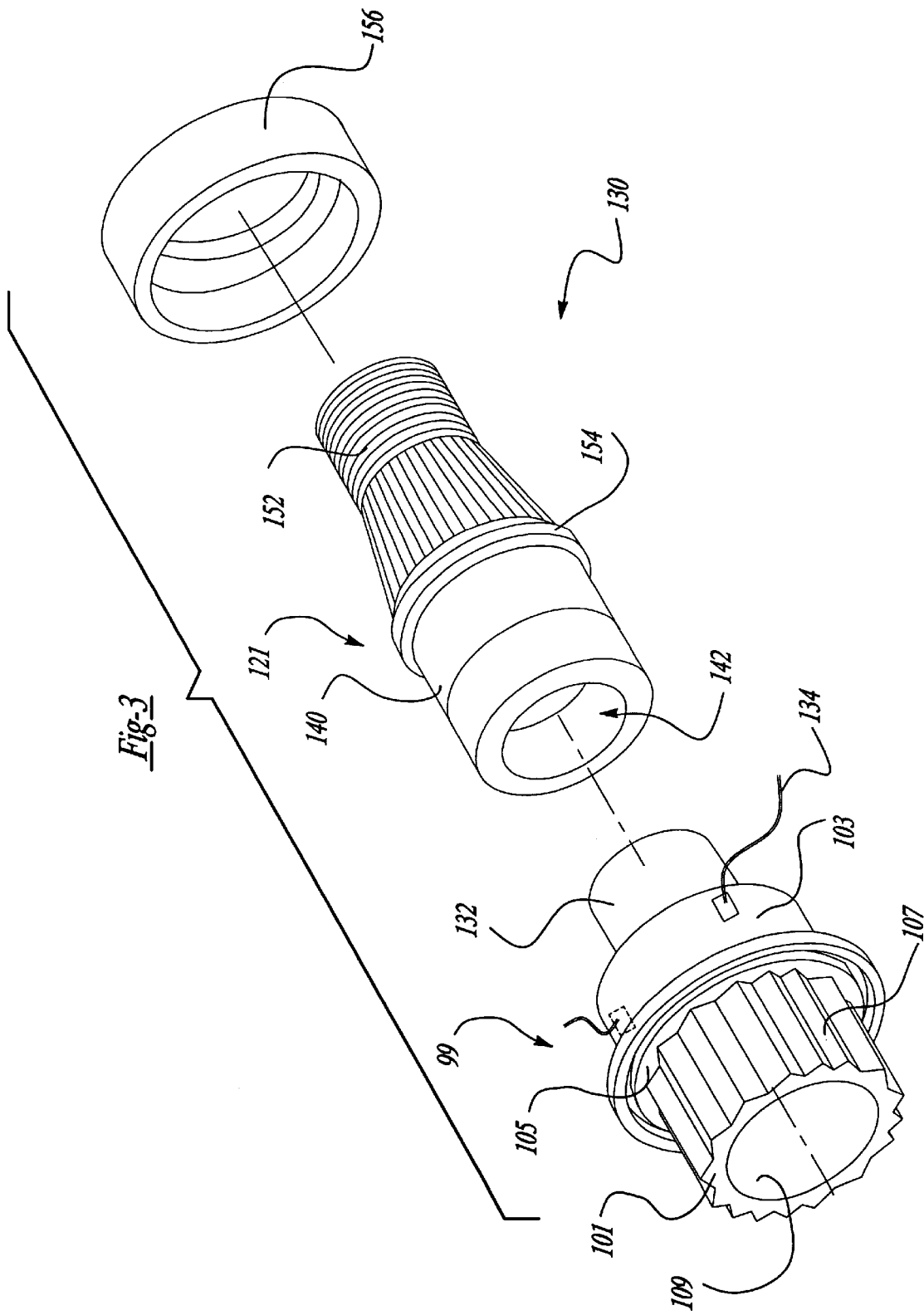
FIG. 3 is an exploded perspective view showing the first preferred embodiment of a magnetic coupling mechanism in a multi-functional apparatus of the present invention.
Figure 5:
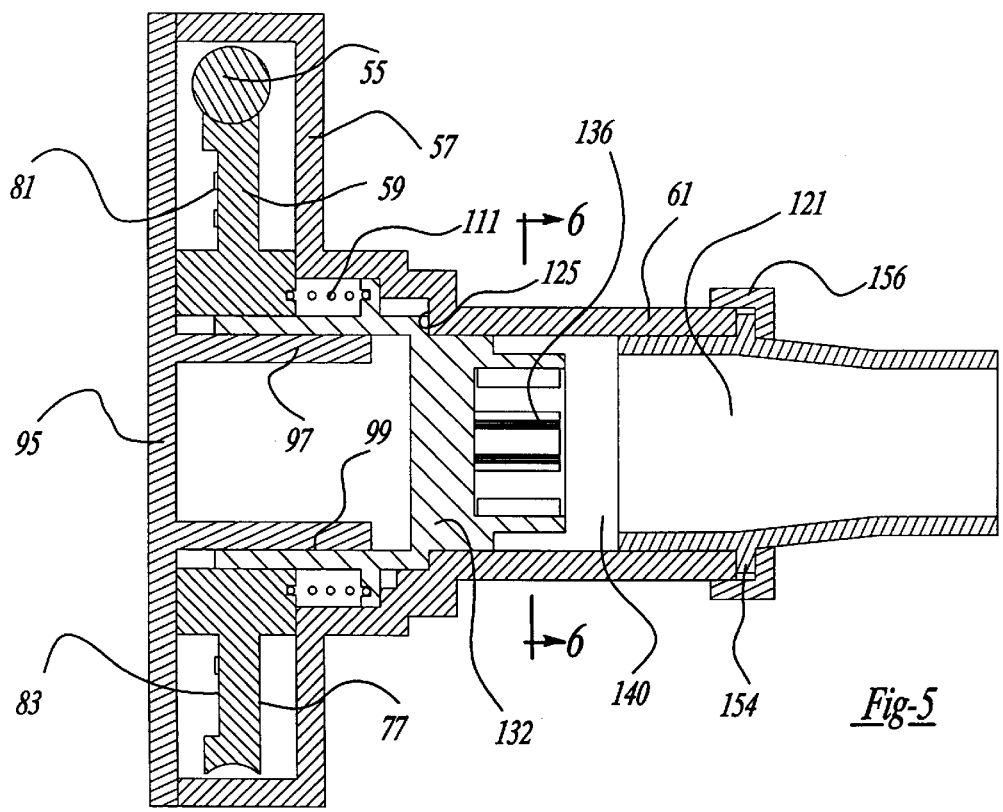
FIG. 5 is a sectional view, taken along line 5—5 of FIG. 4, showing the first preferred embodiment of a magnetic coupling mechanism of the present invention.

The first preferred embodiment of the magnetic coupling mechanism is described in more detail with reference to FIGS. 3, 5 and 6. Solenoid segment includes a coil configuration that electrically couples to electronic control module 321. A preferred coil configuration, similar to the windings of a conventional electric motor, is shown in FIG. 6. It may be envisioned that solenoid designs with other coil configurations may also be employed to generate a magnetic force. Generally, 1–2½ lb. of torque/square inch of surface area (with an upper limit of 10 lb./square inch) can be achieved for transmitted force perpendicular to the magnetic path (i.e., shearing) between adjacent parts. To ensure an adequate magnetic coupling in the present invention, the preferred embodiment increases the surface area between solenoid segment 132 and magnetically conductive segment 140 by creating an overlapping coupling, and thus utilizing the circumference surface area of the parts. Magnetically conductive segment 140 is further defined as a cylinder member with an open socket 142 for receiving solenoid segment 132 of actuator shaft 99. Magnetically conductive segment 140 creates an efficient magnetic path for the field induced by internal windings 136 of the solenoid segment 132. Permanent magnets can alternatively be used as a manner to decrease the power requirements in moderate torque situations. For instance, magnetically conductive segment 140 may be comprised of a permanently magnetic material with adjacent opposite fields as associated with the induced fields. The electromagnet can be dispersed either inside or outside of the corresponding return path. Electrical leads 134 are shown extending from a peripheral surface of solenoid segment 132. Internal to solenoid segment 132 (not shown), electrical leads may be attached to conductive rings disposed around the shaft with one lead connected to the closest ring and the other lead tunneling through the shaft to make its connection and coupled to the control system through brushes attached to the case Alternatively, one termination could connect to ground through the shaft, bushing and casing, and a second termination could be attached to a conductive ring and brush assembly as described above to complete the circuit.

The operation of magnetic coupling mechanism 130 employed with the present invention can best be understood by referring to FIGS. 7A and 7B. When a rear window wiper switch is set in an operational mode, motor 51 causes spring tab 75 and helical gear 59 to oscillate or reciprocate within a wiper positional range. Concurrently therewith, upon receipt of the appropriate electrical command, solenoid segment 132 of actuator shaft 99 is energized, and thus creating a magnetic coupling between solenoid segment 132 of the actuator shaft 99 and magnetically conductive segment 140 of wiper shaft 121. During this cyclical oscillating wiper operation, actuator shaft 99 magnetically engages with wiper shaft 121 as seen if FIG. 7A. Accordingly, wiper arm 137 and wiper shaft 121 rotate in unison with actuator shaft 99 and helical gear 59.

When the rear wiper switch is turned to an off setting, the electronic control unit 321 instructs motor 51 to rotate helical gear 59 to a wiper arm park position. This also causes actuator shaft 99 to disengage from wiper shaft 121 as shown in FIG. 7B. By discontinuing the electric signal, solenoid segment 132 will be deenergized, and thus the magnetic force between actuator shaft 99 and wiper shaft 121 ceases. The wiper assembly may be moved off the rear window and onto a holding bracket on liftgate door designated as wiper blade park/depressed position. This allows for movement of rear window without interference of the wiper assembly.

Magnetic coupling mechanism 130 enables coupling between actuator shaft 99 and wiper shaft 121 independent from the actuating of any window/liftgate locking devices. A multi-functional apparatus may utilize a single motion mechanism to actuate a wiper shaft, window lock and liftgate lock. To prevent damage to the wiper, existing apparatus may not permit the liftgate and/or window to be unlocked and opened, unless the wiper blade is in a park position. However, if the window wiper is frozen onto the window or otherwise affixed in a non-park position, the single motion mechanism may not operate to allow the liftgate/window to be unlocked. Since magnetic coupling mechanism 130 is electrically controlled, the design of a multi-functional apparatus can be simplified to address these concerns.

If a locking mechanism has been activated and the electronic control unit 321 senses that wiper blade is affixed in a non-park position, then electronic control unit 321 may disengage actuator shaft 99 from wiper shaft 121. By disengaging magnetic clutch 130, multi-functional apparatus 41 (employing a single motion mechanism) can still release the window or unlock the liftgate with the wiper blade in a non-park position. Actuator shaft 99 may or may not continue to rotate, but without a magnetic coupling there will be no rotation of wiper shaft 121.

Figure 8:
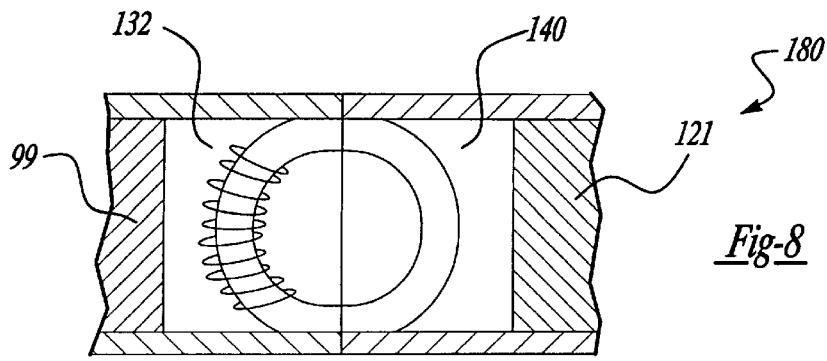
FIG. 8 is a fragmentary sectional view, taken along line 5—5 of FIG. 4, showing a second preferred embodiment of a magnetic coupling mechanism of the present invention.
Figure 9A:
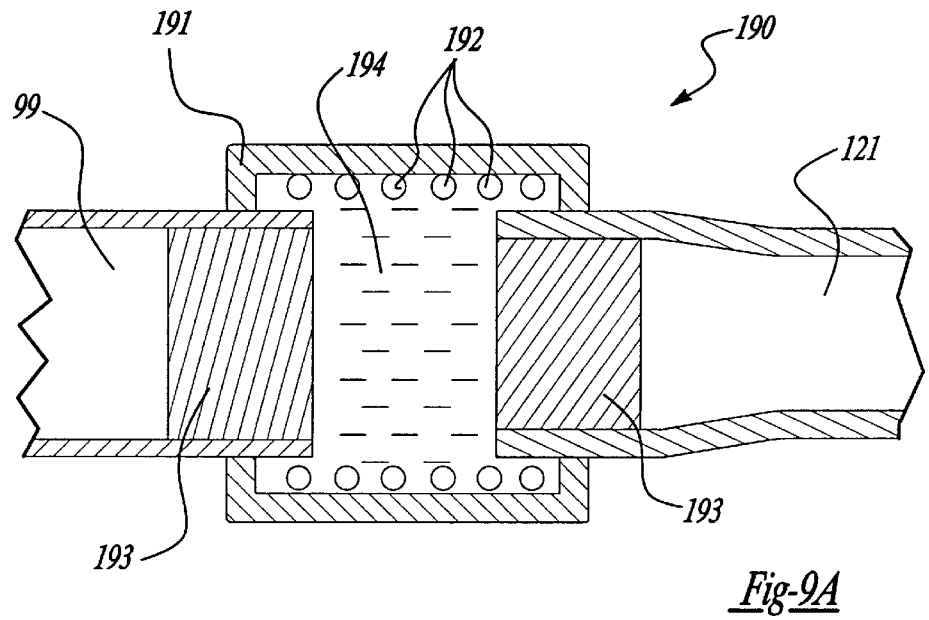
FIG. 9A is a fragmentary sectional view, taken along line 5—5 of FIG. 4, showing a third preferred embodiment of a magnetic coupling mechanism of the present invention.

Alternative embodiments of the magnetic coupling mechanism of the present invention are shown in FIGS. 8 and 9. In FIG. 8, a second embodiment of magnetic coupling mechanism 180 includes magnetically conductive segment 140 of wiper shaft 121 defined as having a solid cylinder member. Rather than an overlapping coupling, solenoid segment 132 of actuator shaft 99 abuts magnetically conductive segment 140 of wiper shaft 121. Since this configuration significantly decreases the contacting surface area between the two shafts, this embodiment will support low torque coupling applications. It may also be envisioned that a similar embodiment would replace solenoid segment 132 and magnetically conductive segment 140 with two permanent magnetic coupler. Permanent magnetic coupling devices, such as the face-to-face torque coupling devices manufactured by Dexter Corporation, of Billerica, Mass., are then attached to the end of both actuator shaft 99 and wiper shaft 121. Use of two permanent magnetic coupling devices does not permit the engaging/disengaging functionality previously discussed, rather actuator shaft 99 and wiper shaft 121 will remain engaged.

Figure 9B:
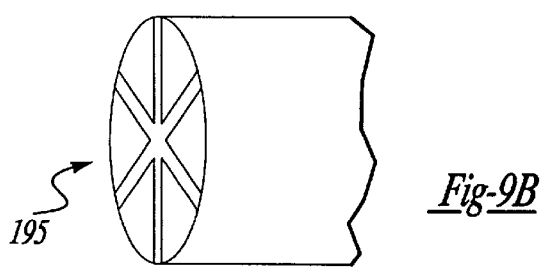
FIG. 9B is a fragmentary perspective view showing a shaft with raised members used in a third preferred embodiment of a magnetic coupling mechanism of the present invention.

FIG. 9 illustrates the use of a magnetic particle clutch for a third embodiment of a magnetic coupling mechanism 190 of the present invention. In this embodiment, an iron cylindrical casing is used to enclose the end of each shaft. Electrical windings 192 along the inside circumference of casing 191 will be used to generate a magnetic force. In addition, a segment 193 at the end of each shaft will be comprised of ferrous material. Enclosed within casing 191 and between the ends of the two shafts is a magnetic fluid 194, consisting of micro-sized ferrous particles. As will be apparent to one skilled in the art, an electrical signal being sent through windings 192 generates the magnetic field needed to stiffen magnetic fluid 194 enclosed in casing 191 through the interaction of the micro particles to each other along the magnetic path. As a result, a magnetic torque coupling is created, such that actuator shaft 99 will rotate in conjunction with wiper shaft 121. To increase torque transmittance to each shaft, a plurality of protruding members 195 may also be defined on the end of each shaft as shown if FIG. 9B.

Figure 10:
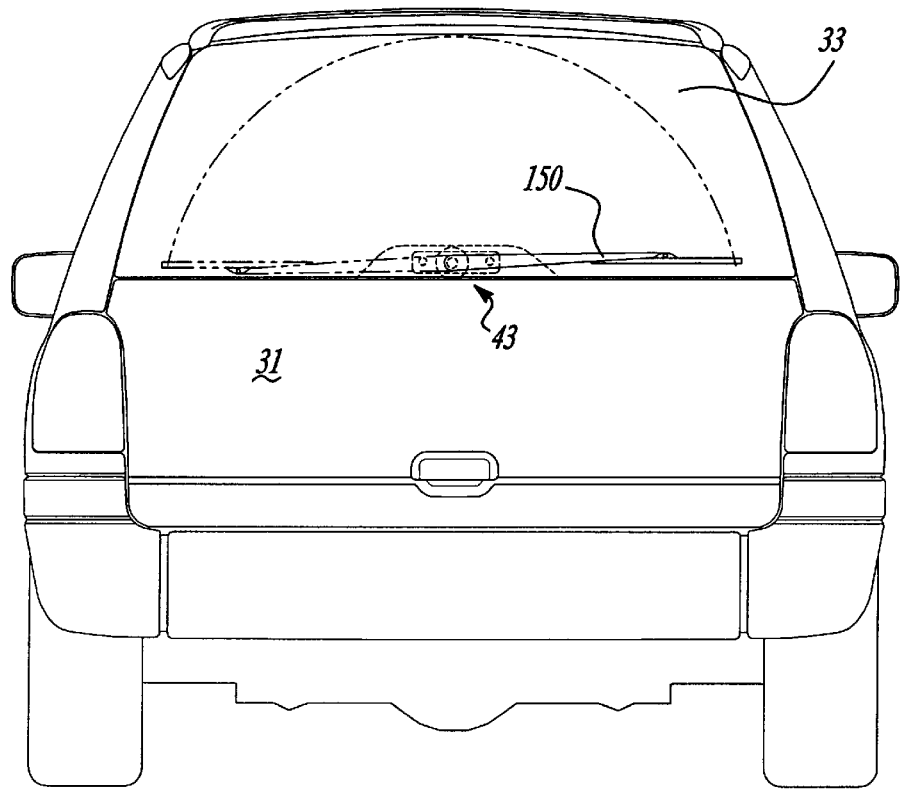
FIG. 10 is a rear elevational view showing the alternative embodiment of a multi-functional apparatus employing a magnetic coupling mechanism of the present invention.
Figure 11:
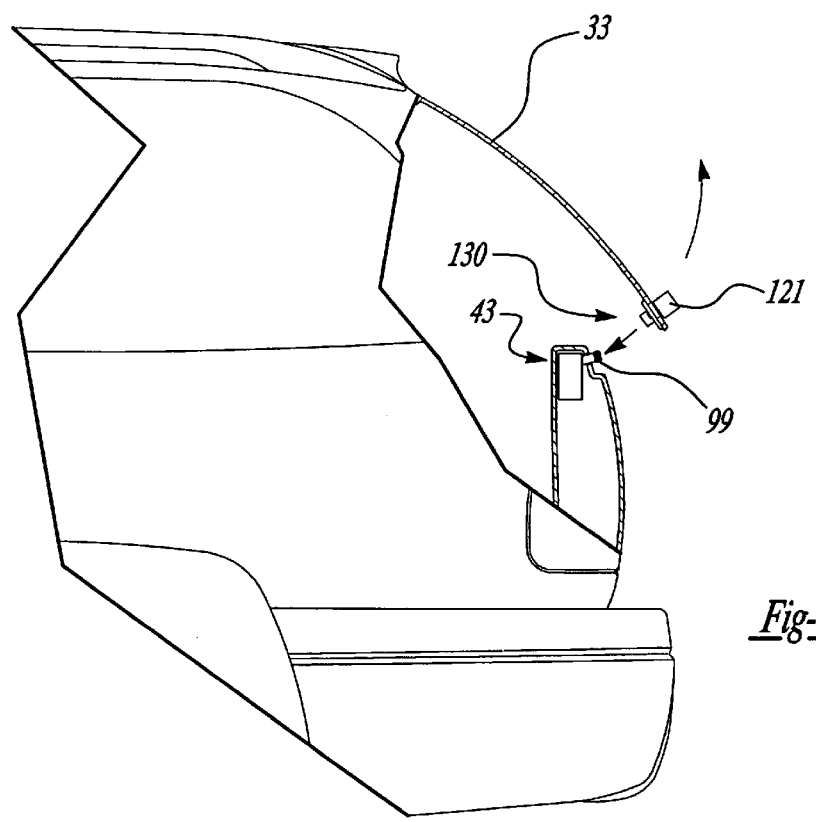
FIG. 11 is a fragmentary perspective view showing the alternative embodiment of the magnetic coupling mechanism of the present invention, illustrating a window wiper shaft being separated from an actuator shaft when a window is pivoted to an open position.

FIG. 10 illustrates central drive unit 43 of a multi-functional apparatus being mounted on an inner surface of liftgate, such that wiper shaft 121 (not shown) protrudes through rear window 33. Repositioning central drive unit 43 at the top of liftgate facilitates wiper arm 150 being rotated 180 degrees across window 33. It may also be envisioned that central drive unit 43 is mounted on inside surface of window 33. With regards to magnetic coupling mechanism 130, actuation shaft 99 may be coupled to wiper shaft 121 within central drive unit 43 (as previously discussed). In this case, wiper shaft 121 would extend through a hole in window 33 as best seen in FIG. 11. Moreover, magnetic coupling mechanism 130 also allows the window to be opened when wiper arm 150 is affixed in a non-park position. Since actuator shaft 99 is disengaged from wiper shaft 121 upon activation of a release window switch, window 33 can be pivoted to its open position with wiper arm 150 remaining affixed to window 33. Upon closing window 33, wiper shaft 121 is realigned with actuator shaft 99. By re-establishing a magnetic coupling between the two shafts, the multi-functional unit can continue normal wiper operations.

Figure 12:
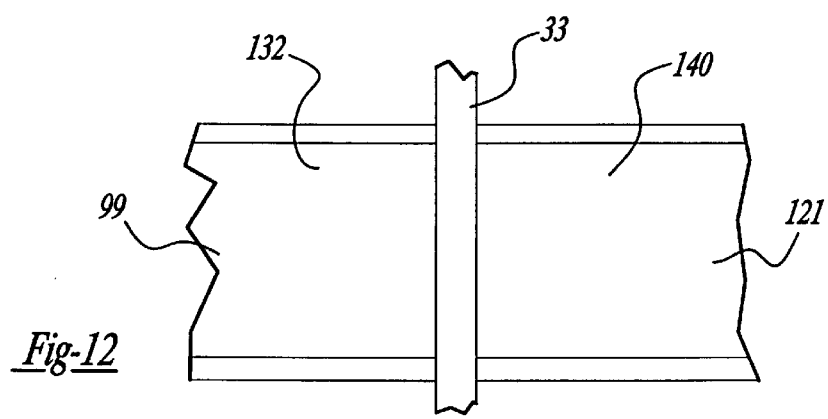
FIG. 12 is a fragmentary sectional view of an alternative embodiment of the magnetic coupling mechanism of the present invention.

It is also envisioned that a magnetic coupling mechanism allows for the coupling between the two shafts to occur through window 33 and outside central drive unit 43. Actuator shaft 99 abuts the inner surface of a window 33 and wiper shaft 121 abuts the outer surface of window 33 (in alignment with each other). If solenoid segment 132 of actuator shaft 99 is energized a magnetic coupling occurs between the shafts through window 33, but otherwise would function as discussed above and best seen in FIG. 12.

While various embodiments of this magnetic coupling mechanism have been disclosed, it will be appreciated that various modifications may be made without departing from the present invention. The magnetic coupling mechanism can further be applied to windshield wipers, headlight wipers, side door mechanisms and other split shaft coupling applications. With regards to a multi-functional apparatus, other variations may include a solenoid, electromagnet or other electromagnetic devices being used in place of the previously described electric motor. Furthermore, additional spur gears, pinion gears, sector gears, planetary gears, jack screws, sprockets and chains, pulleys and belts, cables or other force transmitting means may be employed to couple between the electromagnetic device, rotatable member, clutch mechanism, intermittent motion mechanisms or locks. Moreover, a multiple gear transmission, linkage, belt or cable system can alternately couple a wiper assembly to the wiper shaft. It will further be appreciated that a variety of other multiplexed or non-multiplexed, microprocessor or analog circuitry may be used to control the apparatus of the present invention. The intermittent motion mechanisms may also be accomplished by employing other known intermittent motion mechanisms such as Geneva mechanisms, star-wheel mechanisms, intermittent gearing, escapements, ratchet mechanisms or other known selectively actuable devices. For example, reference should be made to the following U.S. patents which are incorporated by reference herewithin: U.S. Pat. No. 5,228,239 entitled "System for Automatically Opening and Closing Doors of Vehicles" which issued to Heo on Jul. 20, 1993; U.S. Pat. No. 4,352,299 entitled "Intermittent Motion Gear Apparatus" which issued to Riggs et al. on Oct. 5, 1982; U.S. Pat. No. 3,443,455 entitled "Intermittent Motion Device" which issued to Zugel on May 13, 1969; U.S. Pat. No. 3,443,442 entitled "Selectively Operable Intermittent Motion Apparatus" which issued to Schweihs on May 13,1969; U.S. Pat. No. 3,442,146 entitled "Intermittent Rotary Motion" which issued to Simpson on May 6, 1969; and U.S. Pat. No. 3,421,380 entitled "Intermittent Motion Apparatus" which issued to Mansour on Jan. 14, 1969, as well as U.S. Ser. No. 08/430,388 entitled "Multi-functional Apparatus employing an Intermitted Motion Mechanism" filed on Apr. 28, 1995 and U.S. Ser. No. 08/431,148 entitled "Multi-functional Apparatus employing an Electromagnetic Device and a Intermitted Motion Mechanism" filed on Apr. 28, 1995. The multi-functional apparatus can also be employed for windshield wipers, side door locks or other automotive vehicle and non-automotive vehicle applications. While various materials, electronic components, circuits and force transmitting members have been disclosed, a variety of other such materials, electronic components, circuits and force transmitting devices may be used. It is intended by the following claims to cover these and any other departures from the disclosed embodiments which fall within the true spirit of this invention.

The invention claimed is:

1. An apparatus for use in an automotive vehicle, said apparatus comprising:

a rotatable driving member;

a driven member acting as a window wiper shaft;

an actuator member driven by said rotatable member; and an automotive window, said window wiper shaft attaching to said automotive window and said window wiper shaft operably disengaging from said actuator member, thereby allowing said window wiper shaft to move with said automotive window;

a magnetic coupling mechanism selectively coupling said driven member to said actuator member, a first portion of said magnetic coupling mechanism coupled to said driven member;

said magnetic coupling mechanism including at least one of said actuator member and said driven member, said magnetic coupling mechanism having a magnetically conductive segment; and at least one of said actuator member and driven member having a solenoid segment adjacent to said magnetically conductive segment, whereby said actuator member magnetically engages said driven member when an electric signal energizes said solenoid segment; said driven member only being couplable to said actuator member by only magnetic force.

2. The apparatus of claim 1 wherein said solenoid segment magnetically engages said magnetically conductive segment across a radial gap.

3. The apparatus of claim 1 wherein said solenoid segment magnetically engages said nagnetically conductive segment across an axial gap.

4. The apparatus of claim 1 wherein said magnetically conductive segment is further defined as a socket for receiving said solenoid segment, thereby increasing transmitted magnetic force between said magnetically conductive segment and said solenoid segment.

5. The apparatus of claim 1 further comprising a lock linkage, whereby said actuator member magnetically disengages from said driven member when said lock linkage moves between a locking orientation and an unlocking orientation.

6. The apparatus of claim 1 wherein said window is located between said solenoid segment of said actuator and said magnetically conductive segment of driven member thereby allowing one of said members to move away from the other of said members when said solenoid segment is deenergized, whereby said actuator member magnetically engages said driven member when an electric signal energizes said solenoid segment of said actuator member.

7. The apparatus of claim 6 wherein said dividing member is further defined as a movable automotive window.

8. An apparatus for use in an automotive vehicle, said apparatus comprising:

a rotatable driving member;

a driven member;

an actuator member driven by said rotatable member;

a magnetic coupling mechanism selectively coupling said driven member to said actuator member, a first portion of said magnetic coupling mechanism coupled to said driven member;

a movable body panel of said automotive vehicle retaining said driven member; and an electromagnetic device operably driving said rotatable driving member;

said actuator member selectively disengaging and moving away from said driven member when said magnetic coupling mechanism is deenergized thereby allowing said actuator member to concurrently move with said body panel if said body panel is moved; said driven member only being couplable to said actuator member by only magnetic force.

9. The apparatus of claim 8 wherein said driven member is further defined as a window wiper shaft.

10. The apparatus of claim 8 wherein:

said magnetic coupling mechanism, including at least one of said actuator member and said driven member, is defined as having a magnetically conductive segment; and at least one of said actuator member and driven member has a solenoid segment adjacent to said magnetically conductive segment, whereby said actuator member magnetically engages said driven member when an electric signal energizes said solenoid segment.

11. The apparatus of claim 8 further comprising:

said electromagnetic device being defined as a single, direct current electric motor having a worm gear segment;

said rotatable driving member being operably driven by and enmeshing with said worm gear segment;

a second actuated device selectively coupled to said single motor; and a third remotely located actuated device selectively driven by said single motor;

said single motor being operable for moving any one of said actuated devices independent of the other of said actuated devices.

12. A multi-functional automotive vehicle apparatus comprising:

a window wiper member;

an electromagnetic device actuable to selectively operate said window wiper member;

a main gear selectively rotated by energization of said electromagnetic device; and a magnetic coupling mechanism selectively coupling said window wiper member to said main gear, a first portion of said magnetic coupling mechanism including a magnetically conductive segment of said window wiper member, a second portion of said magnetic coupling mechanism including a solenoid segment of an actuator member, said solenoid segment being located adjacent to said magnetically conductive segment of said window wiper member, whereby said actuator member magnetically engages said window wiper member when said solenoid segment of said actuator member is energized and a dividing panel located between said portions of said magnetic coupling mechanism, said dividing panel being movable with one of said members.

13. The apparatus of claim 12 further comprising a lock linkage, wherein said actuator member magnetically disengages from said window wiper member when said lock linkage moves between a locking orientation and an unlocking orientation.

14. The multi-functional apparatus of claim 12 wherein said dividing panel is an automotive window, said window wiper member attaches to said automotive window and said window wiper member uncouples from said main gear, thereby allowing said window wiper member to move away from said main gear and in concert with movement of said automotive window.

15. An automotive vehicle apparatus comprising:

an actuator;

a driving member selectively driven by energization of said actuator;

a first driven member located adjacent to said first member;

a magnetic coupling mechanism containing a magnetic fluid which is selectively energizable to magnetically couple together said driving and first driven members for substantially concurrent movement;

a second driven member selectively driven by energization of said actuator, one of said driven members being movable by said actuator substantially independent from the other of said driven members when said magnetic fluid is deenergized;

ferrous material located on an end of said driving and first driven members;

a casing internally retaining said magnetic fluid and said ends; and an electricity carrying winding located adjacent to said casing for operably energizing said magnetic fluid.

16. The apparatus of claim 15 wherein said actuator is a direct current electromagnetic device, said magnetic coupling mechanism acts as a clutch, said magnetic coupling mechanism allows movement of said electromagnetic device even if said first driven member is prevented from moving while said magnetic coupling mechanism is energized.

* * * * *